Nov. 28, 1950         A. J. WOLF ET AL         2,531,759
                          VALVE
Filed Oct. 21, 1947                    3 Sheets-Sheet 1

A. J. WOLF
H. F. MOLLER
W. M. CROOK
INVENTORS

BY *J. Vincent Martin*
   *Ralph R. Browning*
   *James B. Simms*
ATTORNEYS

Nov. 28, 1950 A. J. WOLF ET AL 2,531,759
VALVE
Filed Oct. 21, 1947 3 Sheets-Sheet 2

A.J. WOLF
H.F. MOLLER
W.M. CROOK
INVENTORS
ATTORNEYS

Nov. 28, 1950 A. J. WOLF ET AL 2,531,759
VALVE

Filed Oct. 21, 1947 3 Sheets-Sheet 3

A. J. WOLF
H. F. MOLLER
W. M. CROOK

INVENTOR.

BY *J. Vincent Martin*
*Ralph L. Browning*
*James B. Simms*

ATTORNEYS

Patented Nov. 28, 1950

2,531,759

UNITED STATES PATENT OFFICE 2,531,759

VALVE

Andrew J. Wolf, Henry F. Moller, and William M. Crook, Houston, Tex., assignors to Reed Roller Bit Company, Houston, Tex., a corporation of Texas Application October 21, 1947, Serial No. 781,040

8 Claims. (Cl. 251—102)

This invention relates to valves and has for its general object the provision of an efficient, easily manufactured valve structure of the plug valve type.

More specifically, it is an object of this invention to provide a valve of the plug valve type in which the closure and seat parts are moved directly away from each other before being moved laterally with respect to each other in the opening of the valve.

Another object is to provide a valve in which the closure and seat parts are positively and mechanically moved directly toward and away from each other in the closing and opening operations.

Another object is to provide a valve in which there is no sliding contact of the sealing surfaces over each other during the opening and closing of the valve.

Another object is to provide a valve employing only positive mechanical movements with no necessity for springs, flowable sealing compounds or the like.

Another object is to provide a valve which will afford two spaced closures each effective to prevent flow through the valve.

Another object is to provide a valve in which provision is made for closing off flow both into and from the valve in both directions.

Another object of this invention is to provide a valve in which mechanical forces are exerted on each of two closure members to close off flow at each of two spaced points, and in which the mechanical forces exerted on each closure member to close the same are provided by reaction against the other closure member.

Another object is to provide a valve structure in which the tolerances of dimensions to be observed in the manufacture and fitting of the valve parts may be much greater than must ordinarily be observed with conventional valve structures.

Another object is to provide a valve structure in which both the valve seats and the closure members may be readily replaced without necessity of any critical adjustments to make them seat on and seal with respect to each other.

Another object is to provide a valve structure in which fluid under pressure may be drained from the valve housing when the valve is closed.

Another object is to provide a valve structure in which the stem which operates the valve may be repacked when the valve is in either open or closed position and while it is under pressure.

Another object is to provide a valve structure in which flow may take place therethrough with a minimum of turbulence.

Another object is to provide a valve structure in which the wear which takes place on the various parts will have a minimum effect on the operation of the valve.

Other objects and advantages of this invention will become apparent from the following description taken in connection with the accompanying drawings wherein certain embodiments have been set forth by way of illustration and example.

Figures 1, 2:
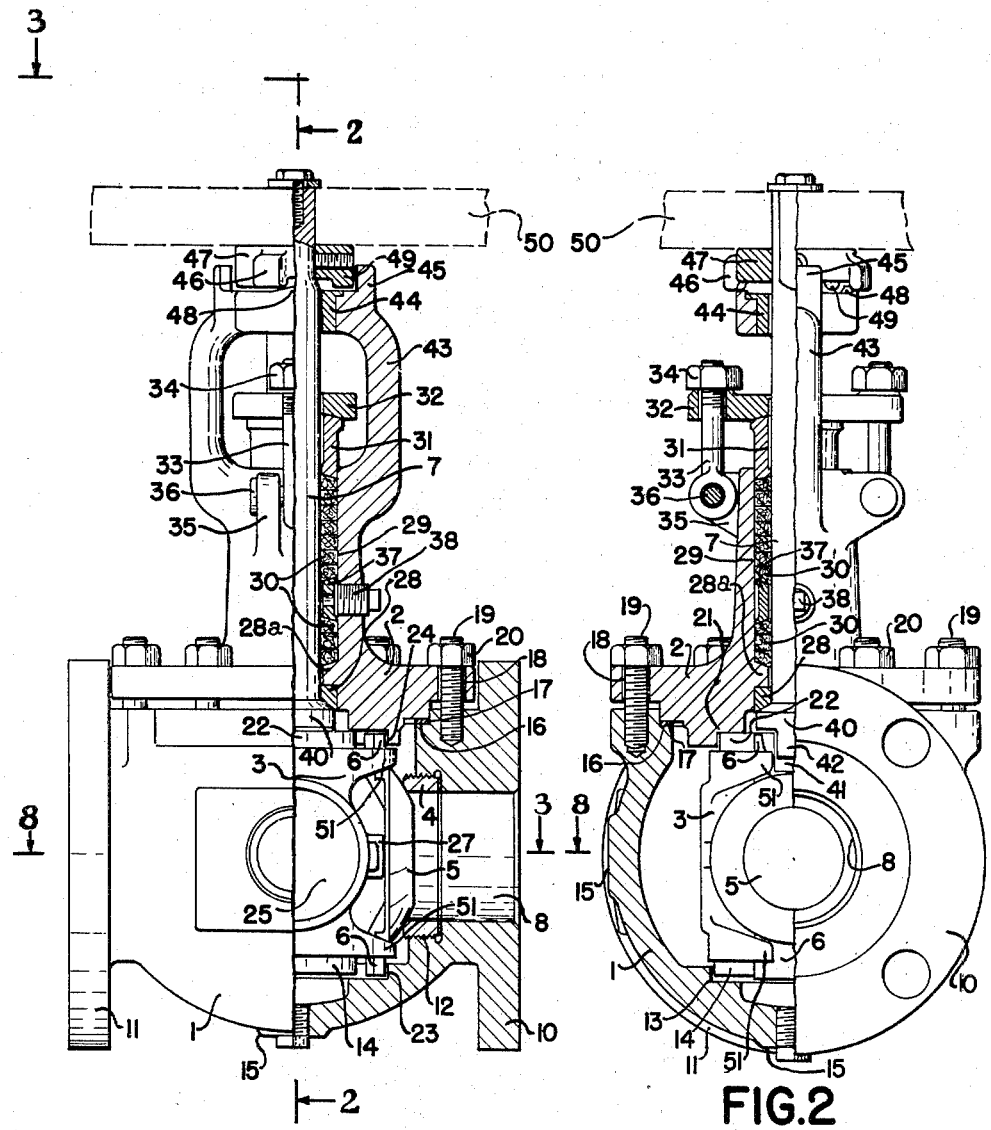
Figure 1 is a view partly in side elevation and partly in vertical cross section illustrating a valve constructed in accordance with this invention with the parts occupying the position which they occupy when the valve is closed.
Figure 2 is a view likewise partly in elevation and partly in vertical cross section taken along the line 2—2 of Figure 1.
Figure 3:
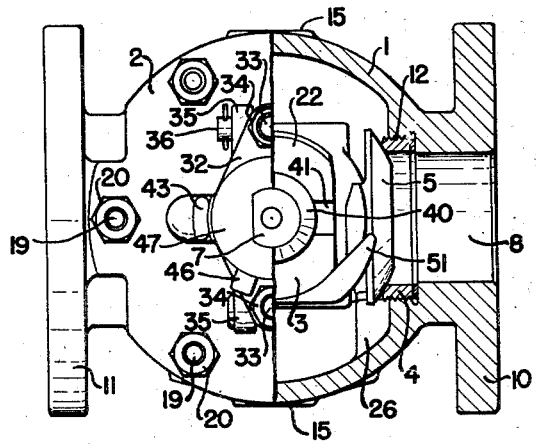
Figure 3 is a view partially in top plan and partially in horizontal cross section taken along the line 3—3 of Figure 1.

Referring more in detail to the drawings, the valve comprises generally the housing 1, the bonnet 2, the carrier 3, the removable valve seat elements 4, the closure members 5, the closure lugs 6, and the operating stem 7.

The valve housing is provided with inlet and outlet openings 8 and 9 either of which may serve as the inlet and either as the outlet, and the housing is open at its upper end, this opening being closed by the bonnet 2 when the valve is assembled.

The valve housing may be provided with any suitable means for coupling it to inlet and outlet pipes or other conduits, the means illustrated in the present instance being in the form of flanges 10 and 11 adapted to be bolted to corresponding flanges on the intake and outlet pipes or conduits.

The inlet and outlet openings are provided with threaded zones 12 adjacent the interior of the housing for the purpose of receiving the valve seat members 4 which are merely threaded into place until they seat firmly within their threaded portions of the housing.

The lower interior of the housing is provided with a countersunk portion 13 which provides both a bearing for the lower reduced end part 14 of the carrier 3 and the major portion of a guide for the lower ends of the closure lugs 6, which thus form guide followers, as will be presently more fully explained. In each of its three sides the housing is provided with a central boss 15 which may if desired be tapped for the purpose of receiving a drain cock or plug whereby the valve housing may be drained under circumstances which will hereinafter be set forth.

The upper open side of the valve housing is machined to provide a seat 16 upon which may be disposed a gasket 17 for forming a seal between the bonnet 2 and the housing 1. The portion of the housing surrounding the opening into which the bonnet fits is provided with a plurality of marginal holes 18 adapted to receive studs 19 which together with nuts 20 provide means for securing the bonnet in place on the housing.

The inner surface of the bonnet, like the inner bottom portion of the housing is countersunk at 21 to provide a bearing for the reduced upper end portion 22 of the carrier 3 and also to provide a guide for the upper ends of the closure lugs 6, which also serve as guide followers.

The countersunk portions 13 and 21 are radially enlarged as shown at 23 and 24 respectively, directly opposite the inlet and outlet openings 8 and 9. These enlargements provide minor guide portions for the closure lugs 6 so that whereas when the closures are in any position except a position directly in register with the valve seat members 4 in the inlet and outlet openings they will be held by the major guide portions 13 and 21 cooperating with the closure lugs 6 out of engagement with the valve seats and the walls of the housing, when they are directly in register with the inlet and outlet openings they will be permitted to move toward the inlet and outlet openings, respectively, and seat against the seat members 4 in such openings.

The carrier 3 as above mentioned is rotatably mounted within the housing, the parts 14 and 22 fitting loosely in rotatable fashion within the countersunk portions 13 and 21 respectively. This carrier has an opening 25 intermediate its ends extending diametrically through the carrier and of substantially the same size and shape as the inlet and outlet openings 8 and 9, and being so arranged that when the carrier is in open position substantially non-turbulent flow will be permitted through the inlet and outlet openings of the housing and the opening 25 through the carrier.

On each of its opposite sides the bearing portions 14 and 22 of the carrier are relieved so that the closure lugs 6 carrying the closures 5 may be placed snugly against the carrier with the ends of the closure lugs 6 fitting within the relieved portions of the bearings 14 and 22 on the carrier and within the regular contour of such bearings. Thus when the closure lugs are disposed snugly against the carrier the ends of these lugs will lie within the regular contour of the bearing portions 14 and 22 of the carrier and will rotate with the carrier within the major guide surfaces provided by the countersinks 13 and 21, respectively. When in this snugly engaged position with respect to the carrier and when held in this position by the major guide portions provided by the countersinks 13 and 21, the closure lugs will hold the closures 5 radially inwardly and out of engagement with the inner walls of the housing 1 so that the carrier may be rotated and the closures thus shifted without any engagement whatever between the closures and the housing.

When the carrier is rotated to closed position, however, and the closures 5 move to the position where they are directly in register with the seats provided on the seat members 4, the ends of the carrier lugs will then be opposite the notched or cut-away minor guide portions 23 and 24, respectively, so that they and the closures will no longer be restrained against radial movement with respect to the carrier and may move directly toward such valve seats until they seat thereagainst. In order that these closures might be stopped in substantially true register with the seat members 4, the housing is provided on one side of each of the inlet and outlet openings with projections 26 adapted to engage one edge of each of the closures respectively as they are rotated toward closed position, and stop their movement at the proper point with the ends of the closure lugs 6 overlying the minor guide portions 23 and 24.

Further movement of the carrier in the direction required to close the valve will produce a fast acting cam or large angle wedging engagement between cooperating cam surfaces provided by the lugs 27 on the carrier and the inclined central portions 27a on the closure lugs on the sides directly opposite the seating surfaces on the closures. This wedging engagement will rapidly move both of the closure lugs radially outwardly with respect to the carrier and with respect to the housing until the closures 5 seat against the seats provided by the seat members 4. The parts are so proportioned that at about the time the closures 5 contact their respective seats, the extremities of the surfaces 27 and 27a will slip past each other whereupon the eccentric cam surfaces 27b on the carrier will engage the surfaces 27c on the closures. The surfaces 27b being eccentric with respect to the axis of the carrier but only slightly so, they will serve as small angle wedges and upon further rotation of the carrier will tightly wedge the closures 5 against their seats. The seating surfaces on the seat members 4 and the closures 5 are preferably made spherical so that a perfect seating engagement will be had without regard to the exact angular disposition of the closures 5 when they engage the seat members 4, but certain circumstances may render it expedient to make one, or possibly even both of these surfaces non-spherical.

It is to be noted that since the bearing engagement between the bearing parts 14 and 22 of the carrier and the countersinks 13 and 21 of the housing and bonnet are made very loose, the carrier may be regarded as having a limited floating movement which will permit it upon the wedging engagement with the closure just described to shift slightly in one direction or the other if necessary in order that it may apply an equal mechanical force to each of the closures. Thus it will be seen that the forces applied to the two closures are balanced against each other and that the force applied to each closure is provided by the reaction from the force applied to the other closure.

It will further be seen that there is a positive mechanical action forcing both closures against their seats and that regardless of the direction of flow through the valve or even if there be no flow through the valve both closures will be moved into sealing engagement with their seats. This makes it possible if desired to drain the fluid under pressure from the housing between the two closures by means of a drain cock or plug hereinbefore referred to. It also makes it possible if desired for any purpose to completely remove the bonnet 2 and all parts carried thereby when the valve is in closed position.

Referring now more in detail to the bonnet and the parts carried thereby, it will be seen that there is disposed in the lower part of this bonnet a combined sealing and bearing ring 28 resting against a radial flange 28a that extends about an opening passing up through the center of the bonnet. Above the flange 28a is a portion of enlarged diameter 29 providing a stuffing box adapted to receive suitable packing 30, and provision is made by means of the gland 31, gland follower 32 and bolts and nuts 33 and 34, respectively, to compress such packing. The bolts 33 may be anchored to the bonnet in any suitable manner as by the ears 35 made integral with the bonnet and pins 36 providing a pivotal connection between the bolts 33 and the ears 35. If desired, a perforated spacer 37 may be placed between the various packing rings 30 and a threaded port with closure plug 38 provided for affording access to this spacer.

The valve stem 7 has on its lower end an enlargement 40, the upper surface of which is adapted to engage the ring 28 and provide a seal against leakage about the stem at all times while the valve is under pressure. This makes it possible at any time to remove the packing rings 30 and replace them, and this may be done whether the valve is in open position or in closed position.

The upper end of the carrier is provided with a slot 41 extending diametrically thereacross in substantial alignment with the cam lugs 27, and the inner end of the stem is provided with a key-like projection 42 adapted to fit within the slot 41 so as to transmit rotary motion from the stem to the carrier. It will be seen that when the carrier is in closed position the disposition of this slot and key will also permit the carrier to float or move slightly toward one closure or the other in the manner hereinbefore described.

The bonnet 2 is provided above the stuffing box portion 29 with a pair of spaced upstanding arms 43 which support a bearing 44 adjacent the upper or outer end of the stem. Projecting upwardly from this bearing portion are a pair of stops 45 adapted to be engaged by lugs 46 on a collar 47 secured to the upper end portion of the stem and limit rotation of the stem in an opening direction, thus determining the open position of the valve carrier and closure. Also, the part of the bonnet carrying the bearing 44 is provided with slightly raised cam-like projections 48 on its upper surface, these being adapted to receive cooperating projections 49 on the lower surface of the collar 47, whereby when the valve is moved to open position the projections 48 and 49 will engage each other and lift the stem into tight sealing engagement with the ring 28.

The stem may be rotated by any suitable wheel, wrench or the like secured on its upper end as indicated diagrammatically at 50.

Figure 9:
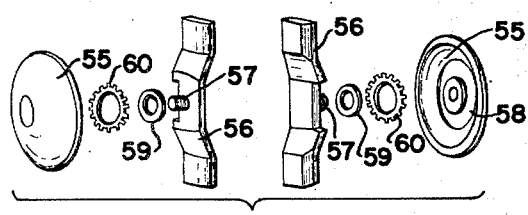
Figure 9 is an exploded perspective view of a modified form of closure and holder assembly showing the two assemblies employed in a single valve.

In Figure 9 of the drawing is shown a slightly modified form of valve closure and closure lug arrangement. In this form, the closure lugs and closures are made of separate parts, the closures being indicated by the numeral 55 and the closure lugs by the numeral 56. The closure lugs are identical with the closure lugs 6 except that instead of being made integral with the closures they are provided with integral threaded stem parts 57 and the closures are provided with threaded centrally disposed openings 58 extending from their rear surfaces. By the use of suitable washer 59 and lock washers 60 the closures 55 may be readily threadedly joined to the closure lugs 56 in a manner which will make it possible for the closures to be readily removed and replaced without necessity for changing the closure lugs. Furthermore, this construction makes possible the manufacture of the closures out of a different material having different wear resistant characteristics from the closure lugs.

Figure 4:
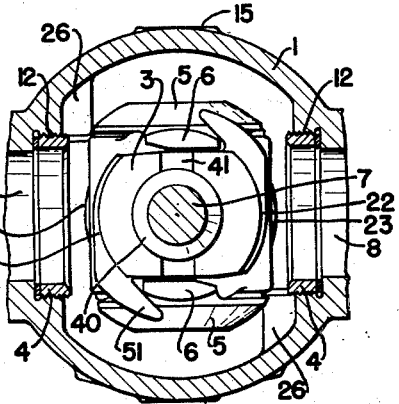
Figure 4 is a fragmentary horizontal cross section similar to the right hand portion of Figure 3 and showing the valve parts in open position.
Figure 5:
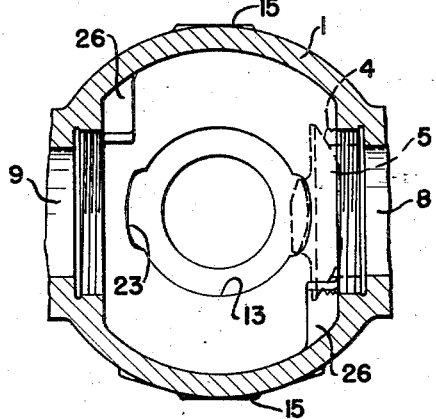
Figure 5 is a view similar to Figure 4 but showing the valve housing only, one valve seat and one closure being indicated in dotted lines in closed position.
Figure 6:
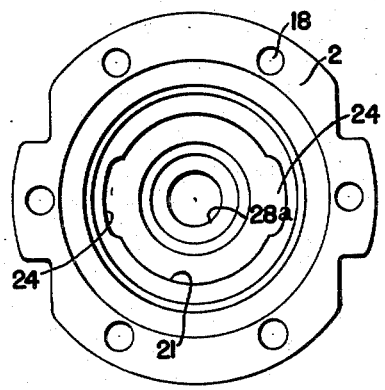
Figure 6 is a view of the inside of the valve bonnet forming a part of the structure shown in Figure 1.
Figure 7:
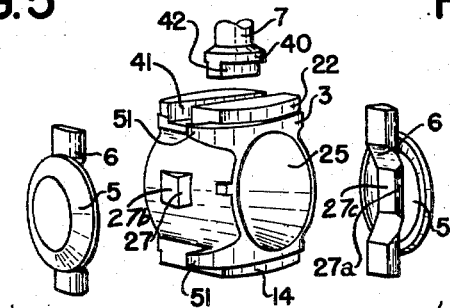
Figure 7 is an exploded perspective view of the valve carrier and closure assembly.
Figure 8:
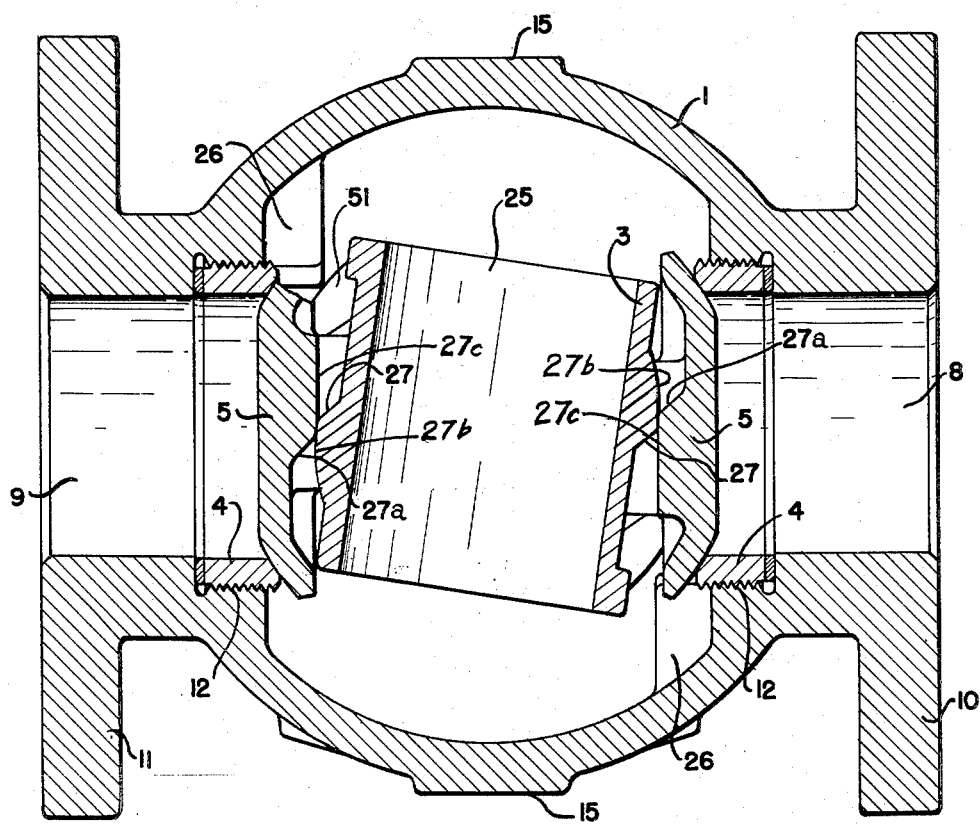
Figure 8 is a horizontal cross section taken along the line 8—8 of Figure 1.

It is thought that the operation of the valve illustrated in the drawings by way of example will be clear from the foregoing description and the drawings. It is noted, however, that if it be assumed that the valve is initially in the open position as illustrated in Figure 4 of the drawings, the closure lugs will be held in position retracted toward the center of rotation of the carrier and out of contact entirely with the walls of the housing by virtue of the engagement between the outer end portions of the closure lugs and the countersinks 13 and 21. This engagement will also hold the closures 5 in retracted position so that there is no contact between these closures and the walls of the housing.

If when the valve is in this position it is in use and connected to a source of fluid under pressure, the entire interior of the valve housing will of course be subjected to the pressure of such fluid. Fluid flow may take place, however, without turbulence through the inlet and outlet openings and through the opening 25 in the carrier, because this opening when in this position will be in direct alignment with the inlet and outlet openings and it is contemplated by the design of this valve that this opening will be of substantially the same cross sectional size and shape as the inlet and outlet openings of the housing. This may be varied somewhat for different sizes of valves but in general the design illustrated and described will permit of an opening through the carrier of such position and size that substantially non-turbulent flow may take place through the valve. The open position of the carrier is determined as hereinbefore stated by the stops 45 and lugs 46 and this will of course be adjusted so that the opening through the carrier when in its open position will be properly aligned with the inlet and outlet openings. It will also be apparent that with the interior of the housing under pressure the valve stem 7 will be urged by such pressure tightly against the sealing ring 28 so as to provide a seal about the valve stem in addition to the seal afforded by the packing rings 30. Thus, even through the valve be open and under pressure, the sealing rings 30 may be removed and replaced while the ring 28 holds the pressure from leaking about the stem.

When it is desired to close the valve, the wrench or wheel 50 is rotated, usually toward the right, and the inner engagement of the cam-like surfaces 27 and 27a will exert a force on the closures and closure lugs tending to move them both circumferentially and radially outwardly. Radially outward movement will be prevented, however, by the engagement of the ends of the closure lugs 6 with the walls of the countersinks 13 and 21. Consequently only circumferential or rotary movement of the lugs will take place and this will take place without engagement of the closures with the housing or any part that does not move.

When closing movement of the stem and carrier has proceeded to such a point that the closures are in substantial register with the inlet and outlet openings but still not in engagement with the seat members 4, the closures will engage the stops 26 and the circumferential or rotary movement of the closures and closure lugs will thereupon be arrested. When in this position, however, the ends of the closure lugs will be in alignment with the cut-away minor guide portions 23 and 24 so that the closure lugs and closures will no longer be restrained against radially outward movement, and further rotary movement of the carrier will cause the large angle wedging or fast acting cam surfaces 27 and 27a to rapidly move the closure lugs and closures radially outwardly until the closures engage or substantially engage the seat members 4. Continued rotary movement of the carrier will cause the small angle wedge surfaces 27b to engage the surfaces 27c on the closures and force the same tightly against their seats. For the reasons hereinbefore explained the forces exerted on the respective closures by the carrier urging them against their respective seat members, will be exactly balanced and both closures will be firmly seated.

When the valve is in this position the interior of the housing will of course still be under pressure but this pressure may be removed if desired by means of the removal of a suitable drain plug or the opening of a suitable drain cock located as hereinbefore described. With such pressure removed no forces will be acting upon the bonnet 2 nor the parts carried thereby and it is therefore apparent that the bonnet and the parts which it carries may be removed entirely from the valve and any parts thereof repaired or replaced. The carrier 3 and the valve seat members 4, closures 5 and the closure lugs 6 must of course remain in place in the valve housing during this time.

If it is not desired to drain the pressure from the housing or if no provision has been made therefor, it is still possible to remove and replace the packing rings 30 in the manner above described the same as when the valve is in open position.

In order to guard against the possibility of a leak occurring around the stem when pressure is first turned into the valve housing after the same has been free of pressure, the inter-engaging cam lugs 48 and 49 are provided, and will serve to force the stem outwardly until the flange 40 is in tight engagement with the ring 28 as the valve is moved toward its closed position.

When it is desired to open the valve after it has been closed, the stem is rotated in the opposite direction or usually to the left. The first movement of the valve carrier which is produced by this movement of the stem serves to relieve the engagement between the cam surfaces 27b and 27c by which the mechanical closing pressure is applied to the closures 5, and further movement serves to engage the hook shaped projections 51 on the carrier with the end portions of the closure lugs 6, exerting a force on such closure lugs tending both to draw them radially inwardly toward the carrier and at the same time to move them circumferentially with the carrier. Initially circumferential movement of the closure lugs and closures is prevented by engagement of the closure lugs in the minor guide portions 23 and 24 so that the initial movement of the closure lugs and closures will be radially inwardly toward the carrier and directly away from the valve seat members 4 until the closure lugs and closures have been moved in far enough to disengage the ends of the closure lugs from the minor guide portions 23 and 24 and permit them to move into the major guide portions provided by the countersinks 13 and 21. Radially inward movement of the lugs and closure members will thereupon cease and the lugs and closure members will thereafter be moved circumferentially with the carrier until movement of the carrier is stopped by inter-engagement of the stop members 45 and lugs 46 as hereinbefore described.

From the foregoing it will be appreciated that there has been provided by this invention a means whereby all of the objects and advantages of the invention may be accomplished. It is further apparent that while certain specific embodiments of the invention have been described herein and shown in the drawings, the same are illustrative only and the invention is limited only by the prior art and by the terms of the appended claims.

Having described our invention, what is claimed is:

1. In a valve, a valve housing having inlet and outlet openings in opposite sides thereof, a closure adapted to seat against each of said openings to close the same and having guide followers thereon, said housing having guide surfaces each with a major part to receive one of said guide followers and hold said closures out of contact with said housing wall except when said closures are directly in register with said openings respectively, and each of said guide surfaces having a cut-away minor part to receive said guide followers respectively and permit said guide followers and closures to move toward said housing wall and openings when said closures are directly in register with said openings to seat said closures against and close said openings, and a carrier rotatable in said housing to engage said guide followers and move the same along said guide surfaces to and from closed positions.

2. In a valve, a valve housing having inlet and outlet openings in opposite sides thereof, a closure adapted to seat against each of said openings to close the same and having guide followers thereon, said housing having guide surfaces each with a major part to receive one of said guide followers and hold said closures out of contact with said housing wall except when said closures are directly in register with said openings respectively, and each of said guide surfaces having a cut-away minor part to receive said guide followers respectively and permit said guide followers and closures to move toward said housing wall and openings when said closures are directly in register with said openings to seat said closures against and close said openings, and a carrier having bearing parts rotatably and floatingly mounted in the major parts of said guide surfaces, said bearing parts being relieved to receive said guide followers and said carrier having parts to engage said guide followers and move the same along said guide surface to and from closed positions.

3. In a valve, a housing having inlet and outlet openings therein, a closure adapted to seat over and close one of said openings and having a guide follower thereon, said housing having a guide surface comprising a major part to receive said guide follower and hold said closure out of contact with said housing wall except when said closure is directly in register with said opening and a cut-away minor part to receive said guide follower and permit said guide follower and closure to move toward said housing wall and opening when said closure is directly in register with said opening, whereby to seat said closure against and close said opening, and a carrier rotatable in said housing and having parts adapted to engage a part of said guide follower and move said follower along said guide surface to and from closed position.

4. In a valve, a housing having inlet and outlet openings therein, a closure adapted to seat over and close one of said openings and having a guide follower thereon, said housing having a guide surface comprising a major part to receive said guide follower and hold said closure out of contact with said housing wall except when said closure is directly in register with said opening and a cut-away minor part to receive said guide follower and permit said guide follower and closure to move toward said housing wall and opening when said closure is directly in register with said opening, whereby to seat said closure against and close said opening, and a carrier rotatable in said housing and having a part adapted to engage a part of said guide follower and move said follower along said guide surface to and from closed position, said housing having a stop carried thereby adapted to stop said closure when it is moved into register with said opening, and said carrier and closure having cooperating wedging surfaces thereon for wedging said closure against said opening when said closure is stopped by said stop in register with said opening and rotary movement of said carrier is thereafter continued.

5. In a valve, a housing having inlet and outlet openings therein, a closure adapted to seat over and close one of said openings and having a guide follower thereon, said housing having a guide surface comprising a major part to receive said guide follower and hold said closure out of contact with said housing wall except when said closure is directly in register with said opening and a cutaway minor part to receive said guide follower and permit said guide follower and closure to move toward said housing wall and opening when said closure is directly in register with said opening, whereby to seat said closure against and close said opening, and a carrier rotatable in said housing and having parts adapted to engage a part of said guide follower and move said follower along said guide surface to and from closed position, said closure and guide follower being in loose engagement with said carrier and having limited movement independently of said carrier.

6. In a valve housing having inlet and outlet openings, a closure adapted to seat against one of said openings to close the same, a carrier within said housing having a wedge surface adapted upon movement of said carrier in one direction to engage said closure to force it toward the opening it is adapted to close, said wedge surface being formed of two parts, the one being a large angle wedge surface adapted to initially engage and force said closure rapidly toward the opening which it is adapted to close, and the other being a small angle wedge surface to subsequently engage said closure and wedge it tightly against the opening it is adapted to close, and means for moving said carrier in said one direction.

7. In a valve, a valve housing having inlet and outlet openings in opposite sides thereof, a closure adapted to seat against each opening to close the same, a carrier between said closures having wedge surfaces adapted upon movement of said carrier in one direction to engage each of said closures to force them toward the openings they are adapted to close respectively, each of said wedge surfaces comprising two parts, the one providing a large angle wedging surface to initially engage and force said closure rapidly toward the opening it is adapted to close, and the other being a relatively small angle wedge part to subsequently engage said closure and wedge it tightly against the opening it is adapted to close, and means for moving said carrier in said one direction.

8. In a valve, a valve housing having inlet and outlet openings in opposite sides thereof, a closure adapted to seat against each opening to close the same, a carrier floatingly mounted between said openings for limited floating movement toward and from each opening and having wedging surfaces on opposite sides thereof adapted upon movement of said carrier in one direction to engage said closures respectively to force them toward the openings they are adapted to close respectively and to balance against each other the forces exerted upon said closures, said wedging surfaces each consisting of two parts, the one part providing a relatively large angle wedging surface to initially engage and force its closure rapidly toward the opening it is adapted to close, and the other providing a relatively small angle wedging surface to subsequently engage said closure and wedge it tightly against the opening it is adapted to close, and means for moving said carrier in said one direction.

ANDREW J. WOLF.
HENRY F. MOLLER.
WILLIAM M. CROOK.

REFERENCES CITED

The following references are of record in the file of this patent:

UNITED STATES PATENTS

| Number | Name | Date |
|---|---|---|
| 217,954 | Perkins | July 29, 1879 |
| 330,800 | Pattee | Nov. 17, 1885 |
| 524,922 | Walsh | Aug. 21, 1894 |
| 627,140 | Powell | June 20, 1899 |
| 791,173 | Anglim | May 30, 1905 |
| 1,995,491 | Wynkoop | Mar. 26, 1935 |
| 2,007,664 | Shaffer | July 9, 1935 |
| 2,306,502 | Rupe | Dec. 29, 1942 |
| 2,385,993 | Johnson | Oct. 2, 1945 |